(No Model.)
T. MAXON.
DRIVE CHAIN LINK.
No. 454,176. Patented June 16, 1891.
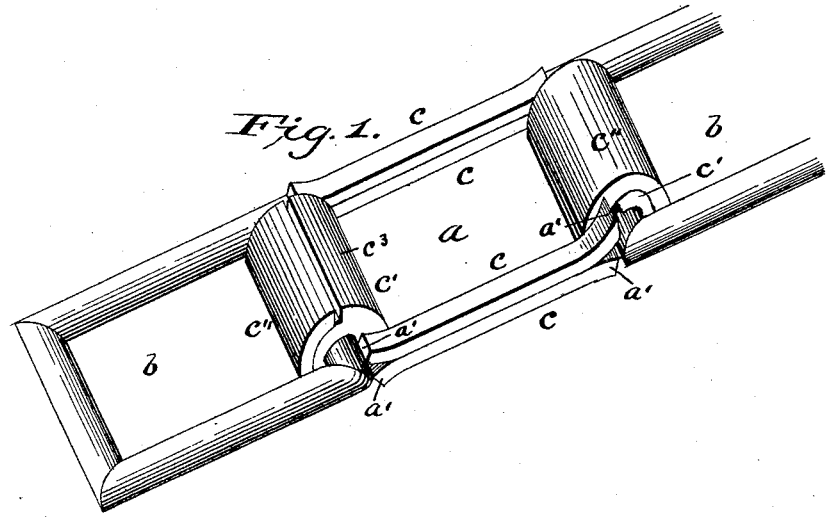
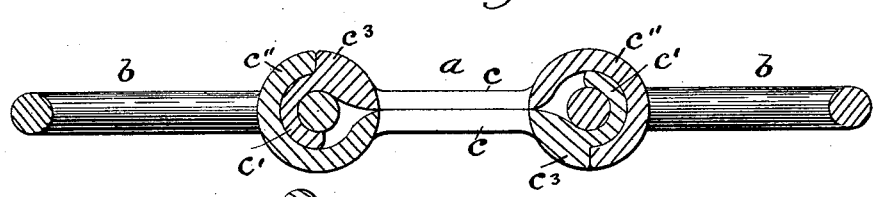
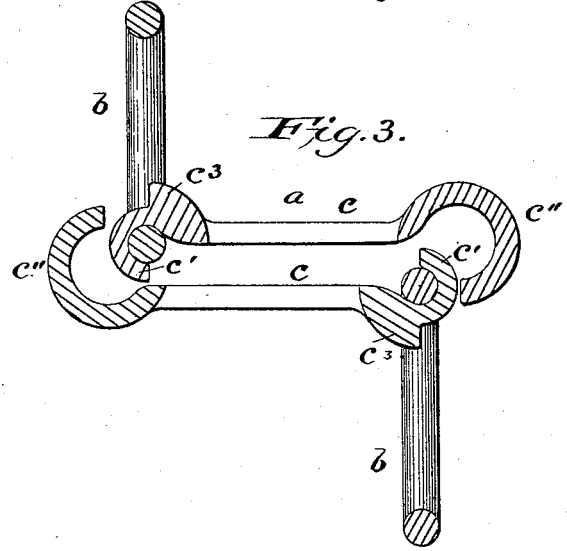
Witnesses
Frank C. Gibson.
R. W. Bishop
Inventor
Thomas Maxon
By his Attorneys
Alexander & Davis

UNITED STATES PATENT OFFICE.

THOMAS MAXON, OF DAYTON, OHIO.

DRIVE-CHAIN LINK.

SPECIFICATION forming part of Letters Patent No. 454,176, dated June 16, 1891.

Application filed March 11, 1891. Serial No. 384,579. (No model.)

*To all whom it may concern:*

Be it known that I, THOMAS MAXON, a citizen of the United States, residing at Dayton, in the county of Montgomery and State of Ohio, have invented certain new and useful Improvements in Link Belting, of which the following is a specification, reference being had therein to the accompanying drawings.

In the accompanying drawings, Figure 1 represents a perspective view of a portion of my improved chain belting; Fig. 2, a longitudinal sectional view thereof, and Fig. 3 a longitudinal sectional elevation showing the manner of disconnecting the parts of the chain.

The object of this invention is, essentially, to produce an extremely simple and practical link for use in chain belting, whereby the same may be readily disconnected at any desired point in its length; and it consists of certain novel features of construction that will fully hereinafter appear, and be particularly pointed out in the claim.

In the drawings, $a$ designates one of my improved links, which are inserted in the chain between the plain links $b$ thereof, these improved links being arranged to alternate with and connect the adjacent end bars of these plain links. The plain rectangular single links $b$ are constructed in the usual manner with round end bars, which are embraced by the end hooks of the interposed separable links. The separable links are each constructed of two flat frames $c$ $c$, loosely superimposed upon each other and provided at their ends with open hooks or cylinders $c'$ $c''$, adapted to embrace each other and entirely inclose the round end bars of the adjacent single-frame links. It will be observed that each of the flat frames is provided at one end with a small hook $c'$ and at its opposite end with a larger hook $c''$, the hooks being formed out of extensions of the respective end bars of the superimposed frames and being of less width than the links, in order that they may work freely between the side bars of the plain links, the said reduction in the diameter of the hooks forming shoulders $a'$. The smaller hook $c'$ of each frame is embraced by the larger hook $c''$ of its adjacent frame, the hooks fitting snugly within each other, and the pivotal end bars of the plain links working in and being inclosed by the inner or smaller hooks. Sufficient space is allowed between the ends of the smaller hooks and the bodies of the frames for the insertion of the round end bars of the plain links, and the openings between the ends of the larger hooks and the end bars of their adjacent frames are sufficiently large to permit the smaller hooks to be readily inserted in the larger ones. The portions of the smaller hooks not embraced by the larger ones are enlarged sufficiently to come flush with and conform to the cylindrical shape of the latter, as at $c^3$, thereby not only materially strengthening the link, but also presenting a smooth, even, exterior wearing-surface for contact with the sprocket-wheels upon which the chain may be working.

To separate the superimposed frames (when it is desired to disconnect the chain for the removal or insertion of links) it is simply necessary to slack up upon the chain sufficiently to permit the two plain links adjacent to the separable link to be turned in opposite directions to positions at right angles to the same, whereupon by a slight endwise movement of the frames in opposite directions the smaller hooks pass out of engagement with the larger ones and the two frames become disengaged.

It will be observed that this improved separable link is very strong and durable; that it is inexpensive, being capable of being readily stamped or cast out of steel; that it renders the chain readily separable at any point without the use of removable screws and without notching and weakening the bars of the frames, and that it is so constructed as to run upon the sprocket-wheels with a minimum of friction and wear, this latter advantage being an important desideratum in this class of chains.

Having thus fully described my invention, what I claim as new, and desire to secure by Letters Patent, is—

An improved separable chain-link, consisting of two loosely superimposed open frames $c$, having formed on their end bars open cylindrical hooks $c'$ $c''$, the hooks $c''$ being larger than the hooks $c'$ and the smaller hook of the lower frame fitting within the larger hook of the upper frame and the smaller hook of the upper frame fitting within the larger hook of the lower frame, the exterior portions of the smaller hooks not embraced by the larger hooks being enlarged, as at $c^3$, to come flush with the exterior of the larger hooks and complete the cylindrical shape thereof, substantially as described.

In testimony whereof I affix my signature in presence of two witnesses.

THOMAS MAXON.

Witnesses:
JOHN L. H. FRANK,
MARGARET MAXON.